United States Patent Office 3,125,054
Patented Mar. 17, 1964

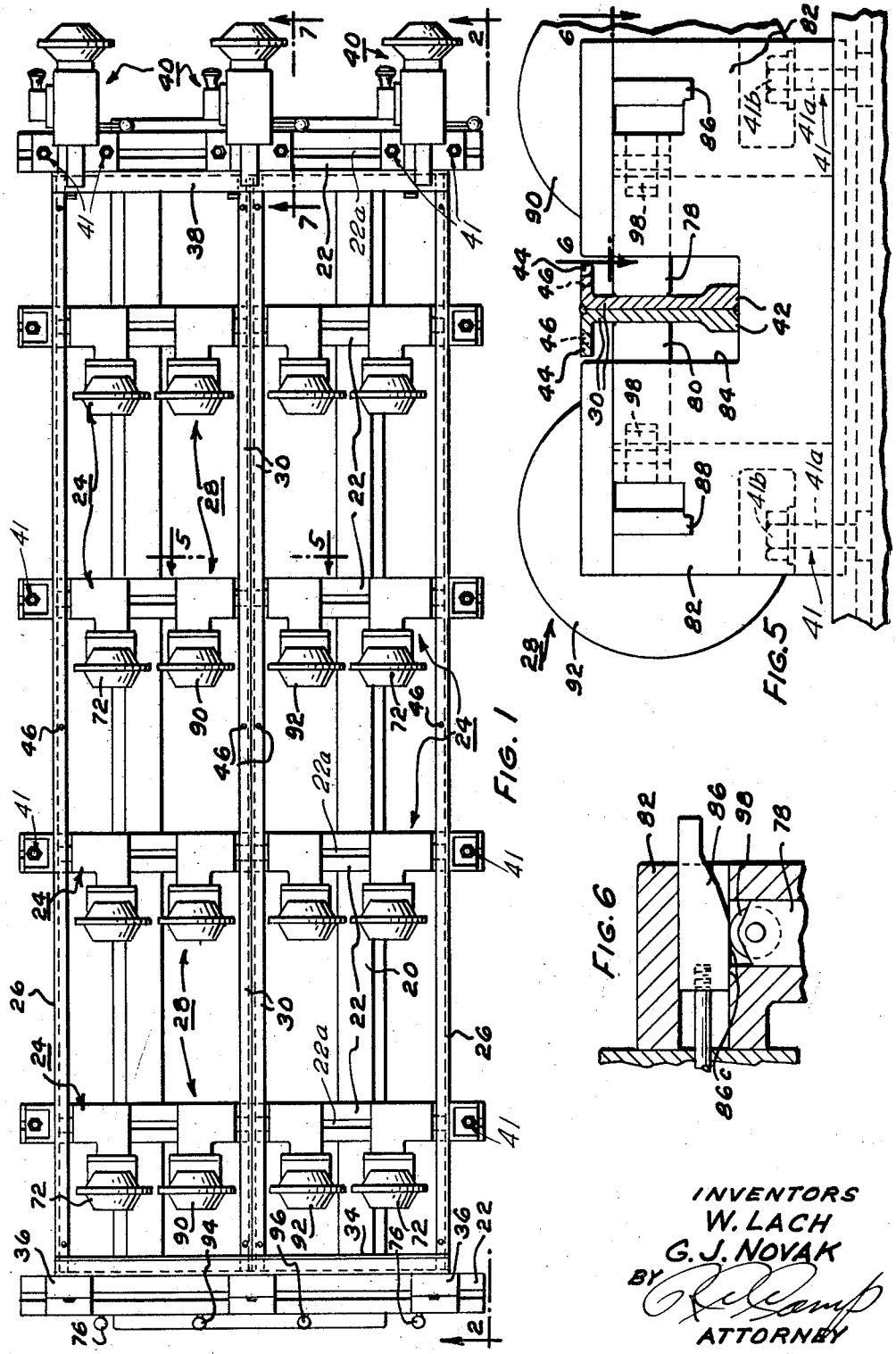

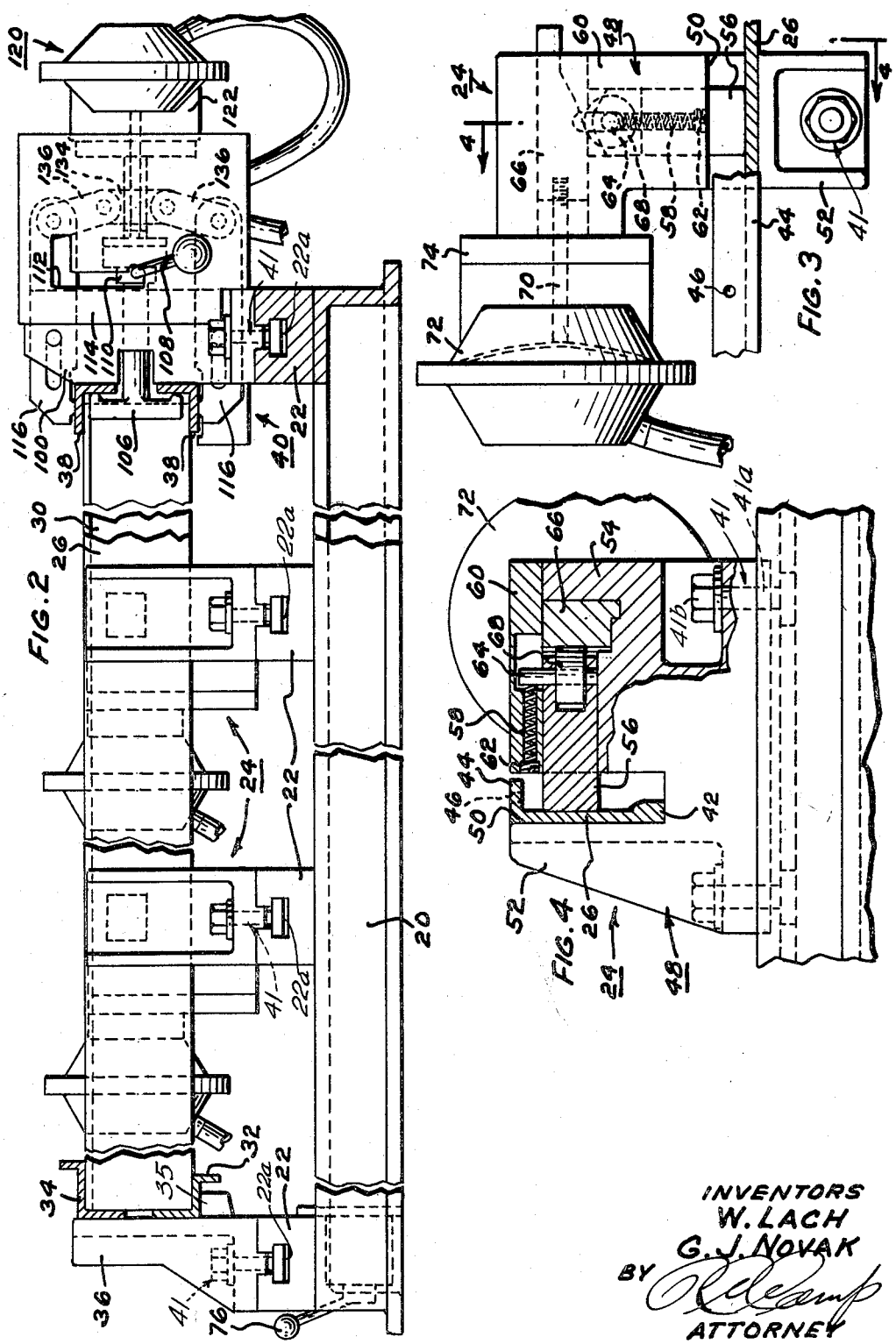

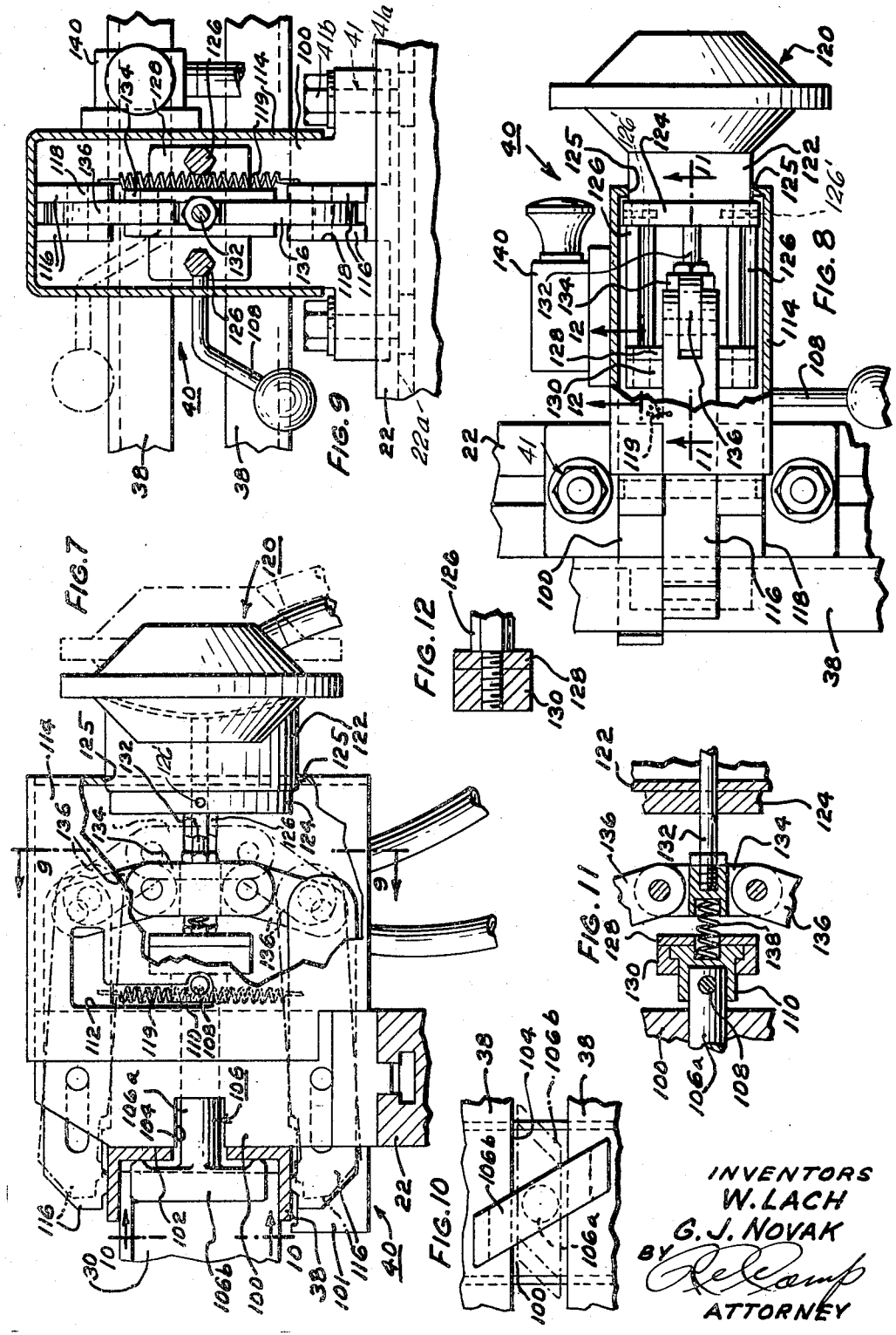

3,125,054
CLAMPING APPARATUS
Walter Lach, Chicago, and George J. Novak, Riverside, Ill., assignors to Western Electric Company, Incorporated, New York, N.Y., a corporation of New York
Filed Feb. 17, 1961, Ser. No. 90,037
14 Claims. (Cl. 113—99)

This invention relates to clamping apparatus, and more particularly to new and improved clamping apparatus for clamping complex articles in position for assembly to one another.

It is standard practice in the assembling of structural members which are to be welded together as a frame, to secure the members in position by hand, using, for example, C-clamps and wedges. This procedure is unsatisfactory because it requires a large number of manual operations and is unduly time consuming. Further, such a procedure is especially undesirable where predrilled holes in the structural members must be located a specific distance apart, because it is extremely difficult to clamp the structural members in position accurately and with any degree of uniformity, and to maintain the members in their proper positions relative to one another during the welding operation.

An object of this invention is to provide new and improved clamping apparatus.

A further object of this invention is to provide new and improved clamping apparatus for clamping articles in position for assembly to one another.

A still further object of this invention is to provide new and improved clamping apparatus in which the positioning and clamping of structural members for assembly as a frame can be accomplished quickly and accurately, and with a high degree of uniformity.

Another object of this invention is to provide new and improved clamping apparatus for securely clamping structural members in fixed positions with respect to one another.

A further object of this invention is to provide new and improved article-clamping assemblies.

The illustrated embodiment of the present invention involves clamping apparatus for quickly and accurately clamping complex articles in desired positions for assembly with one another. In one form, this apparatus includes a clamping assembly for clamping an article having laterally-projecting flanges adjacent the lower portion thereof, the clamping assembly having opposed, retractable, fluid-operated clamping members arranged so that one of the clamping members can be operated to an advanced position to form a positive stop for accurately establishing the ultimate position of the article in the clamping apparatus with respect to other articles. The other clamping member then can be operated toward the one clamping member to clamp the article between the clamping members. Other forms of clamping assemblies may include a first clamping mechanism including a pair of opposed clamping members for clamping an article therebetween, and a second clamping mechanism including a clamping member for exerting a clamping force on the article in a direction at a substantially right angle to the directions of the forces exerted by the opposed clamping members, to clamp the article against a support. The first and second clamping mechanisms are operatively connected to a housing and a piston rod of a fluid cylinder, respectively, so that upon operation of the fluid cylinder the clamping mechanisms exert reactive forces on the article whereby the article may be moved and clamped by the mechanisms simultaneously. This insures positive seating of the article against the support and accurate positioning of the article in the clamping apparatus.

Other objects, advantages and novel aspects of the invention will become apparent upon consideration of the following detailed description in conjunction with the accompanying drawings wherein:

FIG. 1 is a plan view of clamping apparatus constructed according to the present invention and showing structural members clamped thereby in fixed positions with respect to one another for assembly as a frame;

FIG. 2 is an enlarged elevational view of certain parts of the clamping apparatus shown in FIG. 1, with parts broken away;

FIG. 3 is an enlarged plan view of a clamping assembly for clamping a longitudinally-extending structural member;

FIG. 4 is a partial cross-sectional view taken substantially along the line 4—4 of FIG. 3;

FIG. 5 is an enlarged view taken substantially along the line 5—5 of FIG. 1, of a clamping assembly for clamping a longitudinally-extending structural member;

FIG. 6 is a cross-sectional view taken substantially along the line 6—6 in FIG. 5;

FIG. 7 is an enlarged elevational view taken substantially along the line 7—7 of FIG. 1, showing a clamping assembly for clamping a pair of angle bars adjacent the ends of the longitudinally-extending structural members;

FIG. 8 is a plan view of the clamping assembly shown in FIG. 7;

FIG. 9 is a cross-sectional view taken substantially along the line 9—9 of FIG. 7;

FIG. 10 is a view taken substantially along the line 10—10 in FIG. 7;

FIG. 11 is a view taken substantially along the line 11—11 in FIG. 8; and

FIG. 12 is a view taken substantially along the line 12—12 in FIG. 8.

The illustrated embodiment of the invention includes an elongated base 20 having a plurality of transversely-extending and longitudinally-spaced guideways 22 mounted thereon. Mounted in those guideways 22 which are intermediate the ends of the base 20, are a plurality of L-shaped clamping assemblies 24 for clamping outer, longitudinally-extending structural frame members 26, and a plurality of center channel-shaped clamping assemblies 28 for clamping a pair of pre-welded longitudinally-extending structural frame members 30. As viewed in FIGS. 1 and 2, the left hand ends of the longitudinally-extending frame members 26 and 30, and a pair of brackets 32 (FIG. 2 only) and 34 to be welded thereto, are supported in the apparatus on a plurality of spaced lugs 35 (FIG. 2 only) each integral with and projecting from an upstanding support member 36 mounted in the guideway 22 adjacent the left end of the base 20. The other ends of the longitudinally-extending frame members, and a pair of angle bars 38 to be welded thereto, are supported in the apparatus by a plurality of clamping assemblies 40 mounted in the guideway 22 adjacent the right end of the base 20.

The clamping assemblies 24, 28 and 40 and the support members 36 are adjustably mounted in the guideways 22 in a suitable manner, such as by threaded nut and bolt assemblies 41. Referring to FIGS. 1–5, 8 and 9, it is seen that each of the nut and bolt assemblies 41 includes a bolt 41a having a head slidably positioned in an upwardly opening slot 22a in its associated guideway 22, and having a threaded shank extending upward through a suitable flange on its associated clamping assembly or support member so that a clamping nut 41b can be threaded on the bolt to draw the head thereof upward into firm clamping engagement with a pair of opposed laterally projecting flanges on the guideway forming upper walls of the slot 22a along its length. Thus, the clamping assemblies 24, 28 and 40 and support members 36 and be clamped in selected positions in their associated guideways 22, by tightening the nuts 41b on their associated nut and bolt assemblies 41, or can be moved to other positions in the guideways upon loosening of the nuts 41b.

As is best shown in FIG. 4, the outer longitudinally-extending members 26 of the frame illustrated in the drawings are angle bars, each of which includes a lower enlarged reinforcing portion or flange 42, and an upper laterally projecting flange 44. Referring to FIG. 5, the center longitudinally-extending frame members 30 are a pair of such angle bars placed back to back and welded together prior to being placed in the clamping apparatus. The upper flanges 44 of the frame members 26 and 30 have predrilled apertures 46 formed therein which subsequently are to be axially aligned with predrilled apertures formed in mounting members (not shown) for attaching equipment to the completed frame, and therefore it is apparent that the frame members 26 and 30 must be located with respect to one another with reasonable accuracy.

Referring to FIGS. 3 and 4, it is seen that the L-shaped clamping assemblies 24 for clamping the outer longitudinally-extending frame members 26 each include an L-shaped body 48 which receives one frame member 26 in an upwardly opening slot 50 formed by an upstanding member 52 and an upstanding housing 54. Slidably mounted in the upstanding housing for longitudinal movement toward and away from the upstanding member 52 is a substantially rectangular clamping member 56. The rectangular clamping member 56 is biased away from the upstanding member to a normal retracted position by a coil spring 58 which is positioned above the clamping member in a horizontal aperture formed in a top cover plate 60. One end of the coil spring bears against a plug 62 threaded into the top cover plate, and the other end of the coil spring bears against the upper portion of an upstanding pin 64 mounted in the rectangular clamping member 56 and extending downward through a bifurcated end thereof, as shown.

The rectangular clamping member 56 is moved toward the upstanding member 52 by a longitudinally-slidable cam 66 in the upstanding housing 54, the cam having a tapered camming surface along one side thereof which is engageable with a roller 68 mounted in the bifurcated end of the clamping member on a lower portion of the upstanding pin 64. The cam 66 is threadably connected at one end to a piston rod 70 of an air cylinder 72 which is mounted on the upstanding housing 54 by means of a bracket 74. The air cylinder 72 is controlled, along with the air cylinders 72 of the other L-shaped clamping assemblies 24 on the same side of the apparatus, by a corresponding valve 76 mounted at the left end of the base 20 (FIGS. 1 and 2). When the air cylinder 72 is operated to the right as viewed in FIG. 3, the tapered camming surface of the cam 66 moves the clamping member 56 to clamp the longitudinally-extending frame member 26 against the upstanding member 52, as shown.

As shown in FIG. 5, the channel-shaped clamping assemblies 28 for clamping the center, longitudinally-extending frame members 30 are substantially similar to the L-shaped clamping assemblies 24. For example, each of the channel-shaped clamping assemblies 28 includes a pair of opposed clamping members 78 and 80 slidably mounted in upstanding housings 82 on opposite sides of a slot 84 for clamping the members 30. The clamping members 78 and 80 are biased to retracted positions by coil springs (not shown), to permit positioning of the frame members 30 in the slot with the laterally projecting lower flanges 42 thereof adjacent the bottom of the slot, and are moved toward one another to clamp the members 30 therebetween by air operated cams 86 and 88. The cams 86 and 88 are operated by associated air cylinders 90 and 92, the air cylinder 90 being controlled by a valve 94 at the left end of the base 20 (FIG. 1), and the air cylinder 92 being controlled by a similar valve 96.

In operation, the channel-shaped clamping assemblies 28 are positioned in the guideways 22 so that when one of the clamping members of each clamping assembly, as for example the clamping member 78, is moved by its associated cam 86 to the limit of its advanced position as shown in FIG. 6, and the longitudinally-extending frame members 30 are positioned in the slot 84 in engagement with the clamping surface of the clamping member 78, the frame members 30 will be spaced transversely from the outer longitudinally-extending frame members 26 so as to provide a desired spacing between the apertures 46 in the flanges of the frame members 26 and 30. The valve 94 then is operated to actuate the air cylinders 90 and the cams 86 connected thereto, whereby the cams 86 move to a position as shown in FIG. 6 in which flat side surfaces 86c thereof come into engagement with rollers 98 carried on the clamping members 78, the flat side surfaces 86c then acting as positive stops to prevent movement of the clamping members 78 toward their retracted positions.

The valve 96 then is operated to actuate the air cylinders 92, cams 88 and clamping members 80, to clamp the longitudinally-extending frame members 30 against the first operated clamping members 78. Thus, for any particular positioning of the channel-shaped clamping assemblies 28 in the guideways 22 with respect to the L-shaped clamping assemblies 24, the center frame members 30 always will be positioned and clamped in the apparatus at some predetermined distance from the outer members 26.

As is best shown in FIGS. 7, 8 and 9, each of the clamping assemblies 40 at the right hand end of the clamping apparatus, for clamping the angle bars 38, includes an upstanding main body 100 which has a shelf 101 (FIG. 7) for supporting an angle bar, and which has a vertical front side 102 forming a stop surface for receiving legs of the angle bars 38 thereagainst in vertically aligned relationship above and below a transversely extending slot 104. The vertically aligned legs of the angle bars are clamped against the vertical front side 102 by a rotatable and longitudinally-movable T-shaped clamping member 106 (FIGS. 7 and 10) which includes a rod 106a and a laterally-projecting member 106b integral with the rod adjacent one end thereof. The rod 106a extends through the upstanding body 100 and at its other end carries a laterally projecting handle 108. The inner shank portion of the handle 108 is force-fitted in aligned apertures in the rod 106a and in a flanged collar 110 (FIGS. 7 and 11), the flanged collar forming a part of a means for connecting the rod to additional structure subsequently to be described. The handle 108 is movable in an inverted L-shaped slot 112 in a box-shaped shield 114 which is suitably secured to the upstanding body 100. When the handle 108 is in the bottom of the vertical portion of the L-shaped slot 112, as shown in FIGS. 7 and 9, the laterally-projecting member 106b is opposite the vertically aligned legs of the angle bars 38 for clamping the legs of the angle bars against the vertical front side 102. When the handle is in the right hand end (FIG. 7) of the horizontal portion of the slot 112, the laterally-projecting member 106b is positioned in the transversely extending slot 104 to facilitate placing and removal of the angle bars 38.

The spaced horizontal legs of the angle bars 38 are clamped against the upper and lower edges of the longitudinally-extending frame members 26 and 30 by a pair of elongated clamping bars 116 positioned in horizontally extending slots 118 at the upper and lower ends of the upstanding body 100. As shown in FIG. 7, the clamping bars 116 are mounted for slidable and pivotal movement on suitable pins between retracted positions as shown in dashed lines, and clamping positions as shown in solid lines. As shown in FIGS. 7, 8 and 9, the inner ends of the clamping bars 116 are biased toward one another by a spring 119.

Referring to the right side of FIG. 7, it is seen that an air cylinder 120 is provided for operating the T-shaped clamping member 106 and the clamping bars 116 to clamp the angle bars 38 against the vertical front side or stop surface 102 of the upstanding body 100 and against the upper and lower sides of the longitudinally-extending frame members 26, 30, respectively. The air cylinder 120 is connected to the rod 106a of the clamping member 106 and to the inner ends of the clamping bars 116, in a manner now to be described, such that the clamping member and the clamping bars exert reactive forces on the angle bars 38 which tend to equalize one another and thus the clamping member and the clamping bars operate to clamp the angle bars simultaneously.

The air cylinder 120 includes a housing 122 and a vertical mounting plate 124 bolted to the housing, the housing and the plate being of a substantially rectangular shape and being positioned in an opening 125 in the shield 114 so as to be movable horizontally within the opening, with the sides of the opening substantially preventing rotatable movement of the air cylinder. The housing 122 of the air cylinder 120 is mounted on the rod 106a of the T-shaped clamping member 106 for reciprocal movement therewith, by means including a pair of spaced hexagonal studs 126 having reduced cylindrical opposite ends (FIGS. 8 and 12). Each of the hexagonal studs 126 is connected at one of its reduced ends to the vertical plate 124 in a suitable manner, as for example, by a pin 126' positioned in a bore in a side of the plate and extending through an aperture in the reduced end, as shown in FIGS. 7 and 8. The other reduced ends of the hexagonal studs extend through apertures in a vertical plate 128 as shown in FIG. 12, and are threaded into a vertical mounting member 130. As is best shown in FIG. 11, the mounting member 130 is carried on the flanged collar 110 on the T-shaped clamping member 106. Thus it is apparent that the housing 122 of the air cylinder 120 is connected to the T-shaped clamping member 106 for reciprocal movement therewith, and that the clamping member 106 can be rotated about its longitudinal axis with respect to the air cylinder.

The air cylinder includes a piston rod 132 which slidably extends through the housing 122 and the vertical mounting plate 124, and which is threaded into a bifurcated yoke member 134, as is best shown in FIG. 11. The yoke member 134 has bifurcated upper and lower ends which are pivotally connected to links 136, the links 136 in turn being pivotally connected to bifurcated ends of the clamping bars 116. The bifurcated yoke member 134 is resiliently maintained in spaced relationship with respect to the T-shaped clamping member 106 by a spring 138 (FIG. 11) positioned therebetween. Thus it is apparent that reciprocal movement of the air cylinder housing 122 with the T-shaped clamping member 106, as for example through operation of the projecting handle 108, tends to move the piston rod 132 and the clamping bars 116.

In operation of a clamping assembly 40, through use of the operating handle 108 the T-shaped clamping member 106 is positioned with the laterally projecting member 106b in the transversely extending slot 104 and the clamping bars 116 are retracted, whereby the angle bars 38 readily can be positioned adjacent the vertical front side 102. The handle 108 then is moved to the bottom of the vertical portion of the inverted L-shaped slot 112 to position the laterally-projecting member 106b opposite the aligned legs of the angle bars 38, and to move the clamping bars 116, insofar as is permitted by the spring 119, toward their advanced positions opposite the parallel legs of the angle bars. Operation of the air cylinder 120 by means of a valve 140 on the side of the shield 114 then causes the T-shaped clamping member and the clamping bars to exert reactive forces on the angle bars to clamp the angle bars simultaneously.

In this regard, at any one instant the force exerted by the clamping bars 116 tending to force the angle bars 38 against the longitudinally extending frame members 26, 30, and the force exerted by the T-shaped clamping member 106 tending to move the angle bars against the vertical front side 102 of the upstanding body 100, will be substantially equal, or of some prescribed ratio. Because the coefficients of friction between the clamping bars 116 and the angle bars 38, and between the angle bars and the frame members 26, 30, are relatively low, the frictional resistance to movement of the angle bars 38 longitudinally of the frame members 26, 30, will be substantially less than the force being exerted by the T-shaped clamping member. Thus, even where the angle bars 38 are placed in the clamping assembly 40 spaced from the vertical front side 102, the T-shaped clamping member 106 will move the angle bars relative to the frame members 26, 30 and the clamping bars 116 to positions against the vertical front side 102 during a clamping operation, to insure accurate and uniform positioning of the angle bars in the clamping assembly, and consequently in the clamping apparatus.

In view of the manner of operation of a clamping assembly 40, as described above, it is apparent that as the clamping bars 116 thereof move toward one another during a clamping operation to clamp the angle bars 38 against the frame members 26, 30, if the frame members 26, 30 have not yet been clamped by the clamping assemblies 24 and 28, each of the clamping bars 116 will in effect form a stop for limiting the amount which the other clamping bar can move the angle bars 38 and the frame members. On the other hand, if the frame members 26, 30 have been clamped in position by the clamping assemblies 24 and 28, the frame members 26, 30 will act to limit the movement of the angle bars 38 by the clamping bars 116. Thus, each of the clamping bars 116 can act to limit the movement of the angle bars 38 and the frame members 26, 30 by the other clamping bar in one direction, or the frame members 26, 30 can act to limit the movement of each angle bar 38 in one direction, while the front side 102 of the main body 100 operates to limit movement of each angle bar 38 by the T-shaped clamping member 106 in a direction at substantially right angles to the one direction.

From the foregoing description, it is apparent that a new and improved apparatus has been provided which accomplishes the various stated objects. The supports 36 and clamping assemblies 24, 28 and 40 cooperate to provide a clamping apparatus whereby various structural members to be assembled as a frame readily can be positioned in selected locations with respect to one another and can be clamped securely in position. The channel-shaped clamping assemblies 28, in which either the retractable clamping members 78, or the retractable clamping members 80, can be operated to form positive stops, insure accurate positioning of a structural member within the clamping assemblies and with respect to other structural members from which it is to be spaced a preselected distance, even where the structural member has laterally projecting lower flanges as in the case of the longitudinally-extending frame members 30 shown in the drawings. Similarly, the supports 36 and the clamping assemblies 40 provide means whereby the length of each frame in a series of frames is uniform. Further, the clamping assemblies 40, in which the T-shaped clamping member 106 and the clamping bars 116 are operative to exert reactive forces on the angle bars 38 to clamp the angle bars 38 simultaneously, insure uniform positioning and positive clamping of the angle bars adjacent the ends of the longitudinally-extending frame members 26 and 30.

It is to be understood that the above-described arrangements are simply illustrative of the application of the principles of this invention. Numerous other arrangements may be readily devised by those skilled in the art which will embody the principles of the invention and fall within the spirit and scope thereof.

What is claimed is:

1. A device for clamping articles, which comprises a base member, a reciprocable clamping member mounted in said base member including a rod and laterally projecting clamping means adjacent one end of the rod, the clamping means being positionable adjacent one side of said base member for clamping an article against the base member, and said rod extending through said base member beyond the opposite side of said base member, bar means movably mounted in spaced relationship with respect to said clamping member for clamping an article, a fluid cylinder for moving said clamping member and said bar means to article-clamping positions, said fluid cylinder being spaced longitudinally of said clamping member and having a piston and a housing, first rod means connected to said piston and movably extending through said housing, second rod means connected to said housing, linkage connecting said bar means to one of said rod means, and means mounting said other rod means on the rod of said clamping member for reciprocal movement with said clamping member, whereby upon actuation of said fluid cylinder said clamping member and said bar means exert reactive forces upon an article to be clamped and move into their article-clamping positions simultaneously.

2. A device for clamping articles, which comprises a base member, a rotatable and reciprocable clamping member mounted in said base member including a rod and laterally projecting clamping means adjacent one end of the rod, the clamping means being positionable adjacent one side of said base member for clamping an article to the base member, and said rod extending through said base member beyond the opposite side of said base member, bar means movably mounted in spaced relationship with respect to said clamping member for clamping an article, a fluid cylinder for moving said clamping member and said bar means to article-clamping positions and having a piston and a housing, first rod means connected to said piston and movably extending through said housing, second rod means connected to said housing, linkage connecting said bar means to one of said rod means, and means mounting said other rod means on the rod of said clamping member so that said rod means is reciprocable with said clamping member, and so that said clamping member is rotatable relative to said rod means, operation of said fluid cylinder causing said clamping member and said bar means to exert reactive forces upon an article to be clamped and to move into their article-clamping positions simultaneously.

3. A device for clamping articles, which comprises a base member, a reciprocable clamping member mounted in said base member including a rod and laterally projecting clamping means adjacent one end of the rod, the clamping means being positionable adjacent one side of said base member for clamping an article against the base member, and said rod extending through said base member beyond the opposite side of said base member, a pair of movable clamping bars mounted for pivotal and slidable movement on opposite sides of said clamping member in spaced relationship with respect thereto, said clamping bars extending substantially co-extensively with said clamping member and having outer ends which extend substantially beyond the one side of said base member and which are movable toward one another for clamping an article therebetween, a fluid cylinder for moving said clamping member and said clamping bars to article-clamping positions and having a piston and a housing, first rod means connected to said piston and movably extending through said housing, second rod means connected to said housing, linkage connecting the inner ends of said clamping bars to one of said rod means, and means mounting said other rod means on the rod of said clamping member for reciprocal movement with said clamping member, whereby upon actuation of said fluid cylinder said clamping member and said clamping bars exert reactive forces upon an article to be clamped and move into their article-clamping positions simultaneously.

4. A device for clamping articles, which comprises a base member, a rotatable and reciprocable clamping member mounted in said base member including a rod and laterally projecting clamping means on opposite sides of the rod adjacent one end thereof, the clamping means being positionable adjacent one side of said base member for clamping an article to the base member on opposite sides of the rod, and said rod extending through said base member beyond the opposite side of said base member, a pair of movable clamping bars mounted for pivotal and slidable movement on opposite sides of said clamping member in spaced relationship with respect thereto, said clamping bars extending substantially co-extensively with said clamping member and having outer ends which extend substantially beyond the one side of said base member and which are movable toward one another for clamping an article therebetween, a fluid cylinder for moving said clamping member and said clamping bars into article-clamping positions and having a piston and a housing, first rod means connected to said piston and slidably extending through said housing, second rod means connected to said housing, linkage connecting the inner ends of said clamping bars to one of said rod means, means mounting said other rod means on the rod of said clamping member so that said rod means is reciprocable with said clamping member, and so that said clamping member is rotatable relative to said rod means, operation of said fluid cylinder causing said clamping member and said clamping bars to exert reactive forces upon an article to be clamped and to move into their article-clamping positions simultaneously.

5. A device for clamping a pair of angle bars for assembly to members of a frame, which comprises a base member having a slot formed in one side thereof, a rotatable and reciprocable T-shaped clamping member which includes laterally projecting clamping means adapted to be received in the slot, and which includes a rod extending through said base member adjacent the center of the slot and beyond the opposite side of said base member, said clamping member being movable into a position in which said clamping means is received in the slot whereby legs of a pair of angle bars may be positioned in alignment against the one side of said base member on opposite sides of the slot, and being movable into a position in which said clamping means clamps the aligned legs of the angle bars against the one side of said base member, a pair of clamping bars slidably and pivotally mounted in said base member on opposite sides of said clamping member in spaced relationship with respect thereto, said clamping bars extending substantially co-extensively with said clamping member and having outer ends which extend substantially beyond the one side of said base member and which are movable toward one another for clamping the other legs of the angle bars against opposite sides of members of a frame, handle means connected to the rod of said clamping member for manually moving said clamping bars and the clamping means of said clamping member into positions opposite the legs of the angle bars, a fluid cylinder for moving said clamping bars and the clamping means to clamp the angle bars after the operation of said handle means, said fluid cylinder being spaced longitudinally from said clamping member and including a housing and a piston rod which slidably extends through said housing toward said clamping member, linkage connecting the inner ends of said clamping bars to said piston rod, rod means connected at one end to said housing and extending adjacent said piston rod toward said clamping member, means mounting the other end of said rod means on the rod of said clamping member so that said housing is reciprocable with said clamping member, and so that said clamping member is rotatable with respect to said housing, and means substantially preventing rotation of said rod means, said housing and said piston rod with said clamping member, operation of said fluid cylinder causing said clamping member and said clamping bars to exert reactive forces upon the legs of the angle bars and to move into clamping positions simultaneously.

6. A device for clamping structural members in position for assembly as a frame, which comprises an elongated support, transversely-spaced clamping assemblies on said support intermediate the ends thereof for clamping longitudinally-extending members of a frame in spaced relationship, upstanding means on said support adjacent one end thereof and forming a limit for an adjacent end of a frame, a clamping assembly on said support adjacent the other end thereof including a base member having an upstanding side faced toward said upstanding means and forming a limit for an adjacent end of a frame, a reciprocable clamping member mounted in said base member including a rod and laterally projecting clamping means adjacent one end of the rod, the clamping means being positionable adjacent the upstanding side of said base member for clamping transversely-extending structural members against said base member, and said rod extending through said base member beyond the opposite side thereof, a pair of clamping bars movably mounted above and below said clamping member in spaced relationship with respect thereto, said clamping bars extending substantially co-extensively with said clamping member and having outer ends which extend substantially beyond the upstanding side of said base member and which are movable toward one another for clamping transversely-extending structural members against upper and lower sides of the longitudinally-extending members, a fluid cylinder for moving said clamping member and said clamping bars to member-clamping positions and having a piston and a housing, first rod means connected to said piston and slidably extending through said housing, second rod means connected to said housing, linkage connecting the inner ends of said clamping bars to one of said rod means, and means mounting said other rod means on the rod of said clamping member so that said other rod means is reciprocable with said clamping member, and so that said clamping member is rotatable relative to said rod means, operation of said fluid cylinder causing said clamping member and said clamping bars to exert reactive forces upon transversely-extending structural members which are to be clamped thereby, and to move into their member-clamping positions simultaneously, and said clamping member moving the transversely-extending structural members to be clamped thereby, relative to the longitudinally-extending structural members and against the upstanding side of said base member when the members have been placed in said clamping assembly spaced from said side.

7. A device for clamping structural members in position for assembly as a frame, which comprises an elongated support, a plurality of transversely-extending, longitudinally-spaced guideways mounted on said support intermediate the ends thereof, spaced clamping assemblies mounted in said guideways for transverse movement relative to one another for clamping longitudinally-extending members of a frame in selected spaced relationship, a transversely-extending guideway adjacent each end of said support, upstanding members mounted in one of said end guideways and forming limits for an adjacent end of a frame, clamping assemblies adjustably mounted in the other of said end guideways, each of said clamping assemblies in said end guideways including a base member having an upstanding side spaced a predetermined distance from said upstanding members and forming a limit for an adjacent end of a frame, a reciprocable clamping member mounted in each of said base members and each including a rod and laterally projecting clamping means on opposite sides of the rod adjacent one end thereof, the clamping means being positionable adjacent the upstanding side of said base member for clamping transversely-extending structural members against the base member on opposite sides of the rod, and said rod extending through said base member beyond the opposite side thereof, a pair of clamping bars movably mounted above and below said clamping member in spaced relationship with respect thereto, said clamping bars extending substantially co-extensively with said clamping member and having outer ends which extend substantially beyond the upstanding side of said base member and which are movable toward one another for clamping transversely-extending structural members against upper and lower sides of the longitudinally-extending members, a fluid cylinder for moving said clamping member and said clamping bars to member-clamping positions, said fluid cylinder being spaced longitudinally of said clamping member and including a piston and a housing, first rod means connected to said piston and movably extending through said housing, second rod means connected to said housing, linkage connecting the inner ends of said clamping bars to one of said rod means, and means mounting said other rod means on the rod portion of said clamping member so that said other rod means is reciprocable with said clamping member, and so that said clamping member is rotatable relative to said rod means, operation of said fluid cylinder causing said clamping member and said clamping bars to exert reactive forces upon transversely-extending structural members which are to be clamped thereby, and to move into their member-clamping positions simultaneously, and said clamping member moving the transversely-extending structural members to be clamped thereby relative to the longitudinally-extending structural members and against the upstanding side of said base member when the members have been placed in said clamping assembly spaced from said side.

8. A device for clamping an article having oppositely-extending flanges on opposite sides thereof adjacent its lower portion, which device comprises a base member having a slot formed therein for receiving the article with the flanges thereof spaced substantially below the top of the slot, a pair of opposed clamping members slidably mounted in said base member on opposite sides of the slot, both of said clamping members being movable to retracted positions to allow the article to be moved vertically into the slot, and being movable toward one another to positions above the flanges of the article to clamp the article in the slot, a pair of cams movably mounted in said base member and engageable with cam surfaces on said clamping members for moving said clamping members toward one another to advanced positions, one of said cams including means for locking the associated one of the clamping members in its advanced position, means for operating said one cam whereby said one clamping member is moved to its advanced position and locked therein, and means for operating said other cam after said one clamping member has been locked in its advanced position, to move said other clamping member toward its advanced position to clamp the article between said opposed clamping members.

9. A device for clamping an article having oppositely-extending flanges on opposite sides thereof adjacent its lower portion, which device comprises a base member having a slot formed therein for receiving the article with the flanges thereof spaced substantially below the top of the slot, a pair of opposed clamping members slidably mounted in said base member on opposite sides of the slot, both of said clamping members being movable to retracted positions to allow the article to be moved vertically into the slot, and being movable toward one another to positions above the flanges of the article to clamp the article in the slot, resilient means biasing said clamping members into their retracted positions, a pair of cams movably mounted in said base member and engageable with cam surfaces on said clamping members for moving said clamping members toward one another to advanced positions against the action of said resilient means, one of said cams including a substantially flat surface which engages the cam surface on the associated one of the clamping members when the clamping member is in its advanced position, the flat surface extending substantially at right angles to the direction of movement of said one clamping member when so engaged with the cam surface of said clamping member, so as to form a stop for locking said one clamping member in its advanced position, means for operating said one cam whereby said one clamping member is moved to its advanced position and locked therein, and means for operating said other cam after said one clamping member has been locked in its advanced position, to move said other clamping member toward its advanced position to clamp the article between said opposed clamping members.

10. A device for clamping an article having oppositely-extending flanges on opposite sides thereof adjacent its lower portion, which device comprises a base member having a slot formed therein for receiving the articles with the flanges thereof spaced substantially below the top of the slot, a pair of opposed clamping members slidably mounted in said base member on opposite sides of the slot, both of said clamping members being movable to retracted positions to allow the article to be moved vertically into the slot, and being movable toward one another to positions above the flanges of the article to clamp the article in the slot, resilient means biasing said clamping members into their retracted positions, a roller mounted on each of said clamping members, a pair of cams slidably mounted in said base members and engageable with said rollers for moving said clamping members toward one another to advanced positions against the action of said resilient means, said cams each including a substantially flat surface which engages its corresponding roller when the corresponding clamping member is in its advanced position, each flat surface extending substantially at right angles to the direction of movement of the clamping member when so engaged with the roller, so as to form a stop for locking the clamping member in its advanced position, means for operating one of said cams whereby the associated one of said clamping members is moved to its advanced position and locked therein, and means for operating the other cam after said one clamping member has been locked in its advanced position, to move the other clamping member toward its advanced position to clamp the article between said opposed clamping members.

11. Apparatus for clamping first and second members in spaced parallel relationship for assembly into a frame wherein the second member has oppositely-extending flanges on opposite sides thereof adjacent its lower portion, which apparatus comprises clamping means including an upstanding member and a clamping member movable toward said upstanding member for clamping the first member in a fixed position, a clamping assembly spaced from said clamping means, said clamping assembly including a base member having a slot formed therein for receiving the second member with the flanges thereof spaced substantially below the top of the slot, opposed clamping members movably mounted in said base member on opposite sides of the slot, said opposed clamping members being movable to retracted positions to allow movement of the second member vertically into the slot, and being movable toward one another to positions above the flanges of the second member to clamp the second member in the slot, means for operating said clamping member in said clamping means to clamp the first member against said upstanding member, first cam means for operating one of said opposed clamping members in said clamping assembly to an advanced position, said cam means including means for locking said one opposed clamping member in its advanced position whereby said one clamping member forms a positive stop which establishes the ultimate position of the second member in said clamping assembly and the ultimate position of the second member with respect to the first member, and second cam means for operating the other opposed clamping member in said clamping assembly toward an advanced position after said one opposed clamping member has been locked in its advanced position, to clamp the second member between said opposed clamping members.

12. Apparatus for clamping elongated first and second members in spaced parallel relationship for assembly into a frame wherein the second member has oppositely-extending flanges on opposite sides thereof adjacent its lower portion, which apparatus comprises a plurality of clamping means each including an upstanding member and a clamping member movable toward said upstanding member for clamping the first member in a fixed position, a plurality of clamping assemblies spaced from said clamping means, said clamping assemblies each including a base member having a slot formed therein for receiving the second member with the flanges thereof spaced substantially below the top of the slot, opposed clamping members movably mounted in each base member on oppoiste sides of the slot, said opposed clamping members being movable to retracted positions to allow the second member to be moved vertically into the slot, and being movable toward one another to positions above the flanges of the second member to clamp the second member in the slot, means for operating said clamping members in said clamping means to clamp the first member against said upstanding members, first cam means for operating first ones of the opposed clamping members on the same side of said clamping assemblies to advanced positions, said cam means including means for locking said first clamping members in their advanced positions whereby said clamping members form positive stops which determine the ultimate position of the second member in said clamping assemblies and the ultimate position of the second member with respect to the first member, and second cam means for operating the clamping members on the other side of said clamping assemblies toward advanced positions after the first clamping members have been locked in their advanced positions, to clamp the second member between said opposed clamping members.

13. A device for clamping an article, which comprises first clamping means including a pair of opposed clamping bars for exerting substantially opposed forces on an article to clamp the article therebetween, second clamping means including a clamping member for exerting a clamping force on the article in a direction extending at a substantially right angle to the directions of the forces exerted by said clamping bars, to clamp the article against a support, a single fluid cylinder including a housing and a piston rod, means drivingly connecting said housing to one of said clamping means for moving said one clamping means to clamp the article, and means drivingly connecting said piston rod to the other of said clamping means for moving said other clamping means to clamp the article, whereby upon actuation of said fluid cylinder said first and second clamping means exert reactive forces on the article and move into article clamping positions simultaneously.

14. A device for clamping an article, which comprises first clamping means including a pair of opposed clamping bars for exerting substantially opposed forces on an article to clamp the article therebetween, second clamping means including a clamping member for exerting a clamping force on the article in a direction extending at a substantially right angle to the directions of the forces exerted by said clamping bars, to clamp the article against a support, a single fluid cylinder including a housing and a piston rod, means drivingly connecting said housing to one of said clamping means for moving said clamping means to clamp the article, and means drivingly connecting said piston rod to the other of said clamping means for moving said other clamping means to clamp the article, whereby upon actuation of said fluid cylinder said first and second clamping means exert reactive forces on the article and move into article clamping positions simultaneously, the clamping member of said second clamping means moving the article relative to the clamping bars of said first clamping means against the support when the article has been placed in the clamping device spaced from the support.

References Cited in the file of this patent

UNITED STATES PATENTS

| | | |
|---|---|---|
| 1,851,025 | Weiskopf | Mar. 29, 1932 |
| 2,288,796 | Edwards | July 7, 1942 |
| 2,606,583 | O'Connor | Aug. 12, 1952 |
| 2,747,535 | Curry | May 29, 1956 |
| 2,938,480 | Irwin | May 31, 1960 |